United States Patent [19]
Hammarstrand

[11] 3,976,302
[45] Aug. 24, 1976

[54] PIVOTING AXLE SYSTEM FOR TERRAIN VEHICLES

[76] Inventor: Sten Ove Hammarstrand, Fiskebyvagen 14, 824 00 Hudiksvall, Sweden

[22] Filed: Dec. 4, 1974

[21] Appl. No.: 529,476

[30] Foreign Application Priority Data
Dec. 7, 1973  Sweden............................... 7316596

[52] U.S. Cl................................. 280/6 H; 180/41; 280/112 A; 301/125
[51] Int. Cl.².................................... B60G 17/04
[58] Field of Search..................... 301/125; 180/41; 280/111, 112, 6 H, 6.1, 6.11

[56] References Cited
UNITED STATES PATENTS

| | | | |
|---|---|---|---|
| 2,059,419 | 11/1936 | Tuft.................................... | 301/125 |
| 2,967,578 | 1/1961 | Schomers............................ | 180/41 |
| 3,506,079 | 4/1970 | Madler et al. ........................ | 180/41 |
| 3,516,508 | 6/1970 | Lee et al............................. | 301/125 |
| 3,525,534 | 8/1970 | Madler et al. ..................... | 180/41 X |
| 3,792,748 | 2/1974 | Regier................................. | 180/41 |

*Primary Examiner*—Robert R. Song
*Attorney, Agent, or Firm*—Kurt Kelman

[57] ABSTRACT

The invention disclosed relates to a new improved pivoting axle system especially useful for terrain vehicles.

6 Claims, 11 Drawing Figures

PIVOTING AXLE SYSTEM FOR TERRAIN VEHICLES

The present invention refers to a pivoting axle system for terrain vehicles.

The usual method for transferring the weight from a vehicle chassis, including the body and load, to the wheels is by suspending the chassis on the wheel axles at two points on each axle. Common to all road vehicles with a permitted speed of over 30 mph is that a springing system is mounted in connection with each suspension point in such a way that the greatest possible portion of the total weight of the vehicle is sprung. Rigid axles are generally used for lorries, and this means that the two wheels in each pair of wheels are connected to each other to form a rigid system. In passenger cars there is the alternative of swinging axles, so arranged that each wheel can carry out a separate springing movement completely independent of the other wheel on the same general axis.

In connection with these main types of wheel suspension, a number of arrangements are known for improving springing and for making a vehicle well suited to the intended field of use. With road vehicles, special notice has been given to big lorries for heavy transport. In the English Pat. No. 1,335,212, an example is given of a solution with a differential pressure cylinder mounted in connection to each wheel or wheel group. In this system a pressure medium can be brought into communication with the different pressure cylinders, via pipes and valves, for providing varying states of response between the cylinders. In this design the pressure cylinders will be both load carrying and cushioning elements at the same time, while the system enables adjustment for cushioning characteristics as well as load reception to both weight distribution on the vehicle and road conditions.

In another prior art teaching, a solution in the same direction is shown, having a double acting pressure cylinder mounted at each suspension point between the wheel axles and the chassis in co-action with an existing springing system. There are four cylinder chambers to each axle, for a pressure medium which via pressure piping puts the cylinders into communication with each other on the one hand, and with the corresponding chambers in the pressure cylinders to another axle on the other hand. The system is assumed to be self-adjusting, and works completely without valves in the distributional pipes between the different pressure cylinders. Manually influencing the function of the pressure cylinders to suit special conditions is thus not possible.

The latter teaching provides a solution for certain types of terrain vehicles, e.g. log collecting machines, forest tractors and the like. In this area there are also known solutions for providing the best possible adjustment between the wheel positions and the terrain. For example, a system has been described having a double-acting pressure cylinder arranged in combination with a swinging axle for each wheel. By means of a setting valve and via pressure medium piping, the pressure medium can put the different cylinders into communication with each other in different combinations, so that one wheel can be lowered while another is simultaneously raised in relation to the vehicle chassis.

The present invention is directed to essentially terrain vehicles having rigid pivoting axles. Pivoting axles is taken to mean here that the chassis is suspended on each axle at only one point, preferably at the middle of the axle. The suspension point is hinged so that the axle can oscillate in a plane approximately at right angles to the longitudinal direction of the chassis. Springing can be arranged in the hinged point, but in most cases this is not an absolute requirement. The chassis can be rigid or provided with an articulated waist.

According to the invention, there is for example a single-acting or alternatively a double-acting pressure cylinder arranged between the chassis and the rigid pivoting axle on either side of the suspension point. The working chambers of the pressure cylinders are filled with a pressure medium which, via a distribution valve and pressure piping can be transferred from one cylinder chamber to another in a predetermined number of combinations. Moreover, a pressure medium pump is arranged for supplying pressure medium to the pressure cylinders individually or in pairs, the flow direction of the pressure medium being directed by a reversing valve.

The system according to the invention is especially well suited to terrain vehicles and forest machines, which are intended for work in difficult ground conditions. By means of the system, possibilities unavailable with designs known up to now are provided for suiting the position of the vehicle or machine chassis to the terrain. The present system is very simple and reliable in operation.

The characterizing features of the invention will become more apparent from the following wherein.

In the following, an embodiment of the invention will now be described while referring to the attached drawing.

Figure 1:
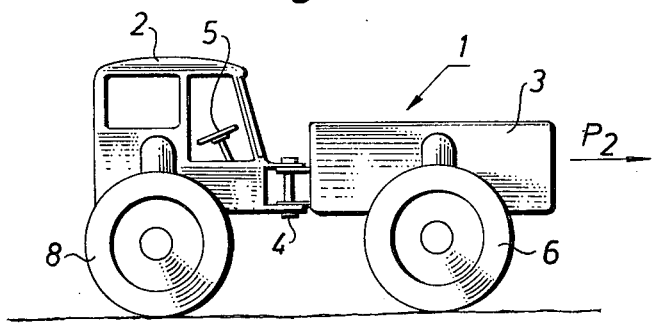
FIG. 1 illustrates, in side elevation, a tractor with waist articulation and equipped with the apparatus according to the invention.

As mentioned by way of introduction, the apparatus according to the invention is not bound to any special chassis design. The chassis can be arranged in different ways and designed with one or more chassis members. In order to best illustrate the invention, a tractor has been chosen, generally designated with the numeral 1 (FIG. 1) having a driver portion 2 and an engine portion 3, which are coupled to each other by waist articulation 4 having a vertical pin allowing movement. This means that both the portions 4 and 3 can be angularly placed in relation to each other in the horizontal plane, but are rigidly joined in the vertical plane. The design of the waist articulation 4 also causes the portions 2 and 3 to be torsionally rigid in relation to each other, so that a twisting movement or twisting force on the one portion is transmitted to the other portion.

Figure 2:
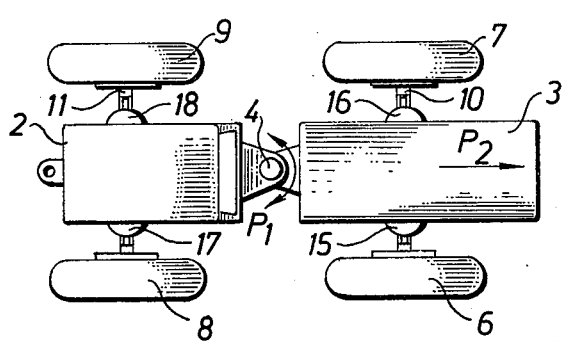
FIGS. 2 and 3 show a plan and end elevation, respectively, of the tractor according to FIG. 1.

The waist articulation 4 is also provided with undefined adjusting means through which the portions 2 and 3 can be twisted in relation to each other according to the double arrow P1, FIG. 2, by the actuation of a wheel 5 in the driver portion 3. Furthermore, there are undefined control means arranged between portions 2 and 3 for the necessary control from the driver portion 2 of both the operation of the vehicle and the apparatus according to the invention. An arrow P2 shows the normal driving direction of the tractor 1.

As is most clearly seen from FIG. 2, each portion 2,3 is carried by two wheels 6,7 and 8,9 respectively, mounted on wheel axles 10,11, of which in the future the axle 10 is called the front axle and the axle 11 is called the rear axle in relation to the normal driving direction of the tractor 1 according to the arrow P2. Both the axles are rigid and are connected to the portions 2,3 in the illustrated example at hinged suspension points 12,13 (FIG. 4) located at the middle of the axles. In a known way, the front axle 10 is provided with a differential 14 and transfers the driving force from the engine portion 3 to its wheels 6,7. The hinged suspension points 12,13 are shown as being non-sprung for the sake of clarity, but it is understood that sprung suspension points come within the scope of the invention.

Figure 4:
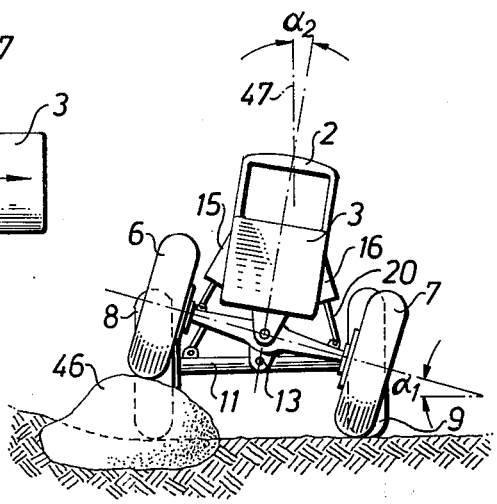
FIGS. 4 and 5 show the tractor according to FIGS. 1–3 on passing over two different sections of terrain.
Figure 3:
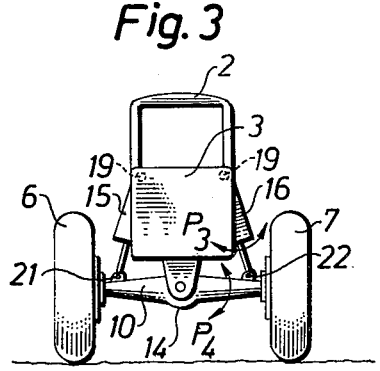
Figure 5:
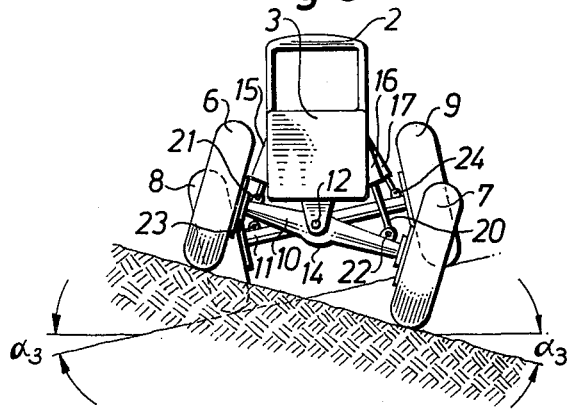

On either side of the suspension points 12,13 the axles 10,11 are connected with respective portions 3,2 by pressure cylinders 15–18. Each pressure cylinder is pivotable in a vertical plane, essentially at right angles to the longitudinal direction of the vehicle, through an upper hinge point 19 (FIG. 3). According to the double arrow P3 (FIG. 3), and a piston rod 20 for each pressure cylinder 15–18 is connected to a hinge point 21–24 (FIG. 5) on the front axle 10 and rear axle 11 respectively. When the axles oscillate according to a double arrow P4 (FIG. 3), the pressuure cylinders 15–18 will obviously oscillate about the upper hinge points 19 according to the double arrow P3, simultaneously with the piston rods moving reciprocatingly in the pressure cylinders. Two characteristic situations for such movements are shown in FIGS. 4,5, and have special effect on the position of the driver portion 2 and engine portion 3, respectively, which will be more closely described in the following.

The pressure cylinders 15–18 are shown in FIGS. 1–5 somewhat obliquely positioned in a direction inwardly towards th portion 2,3. It is emphasized that this position is not specific for the invention and the pressure cylinders can be arranged in all possible ways in connection to the vehicle design in question. For example, it is possible to mount the pressure cylinders essentially horizontally, the movement from the axles 10,11 being transferred to the piston rods 20 via pivoted bell cranks or the like.

Figure 6:
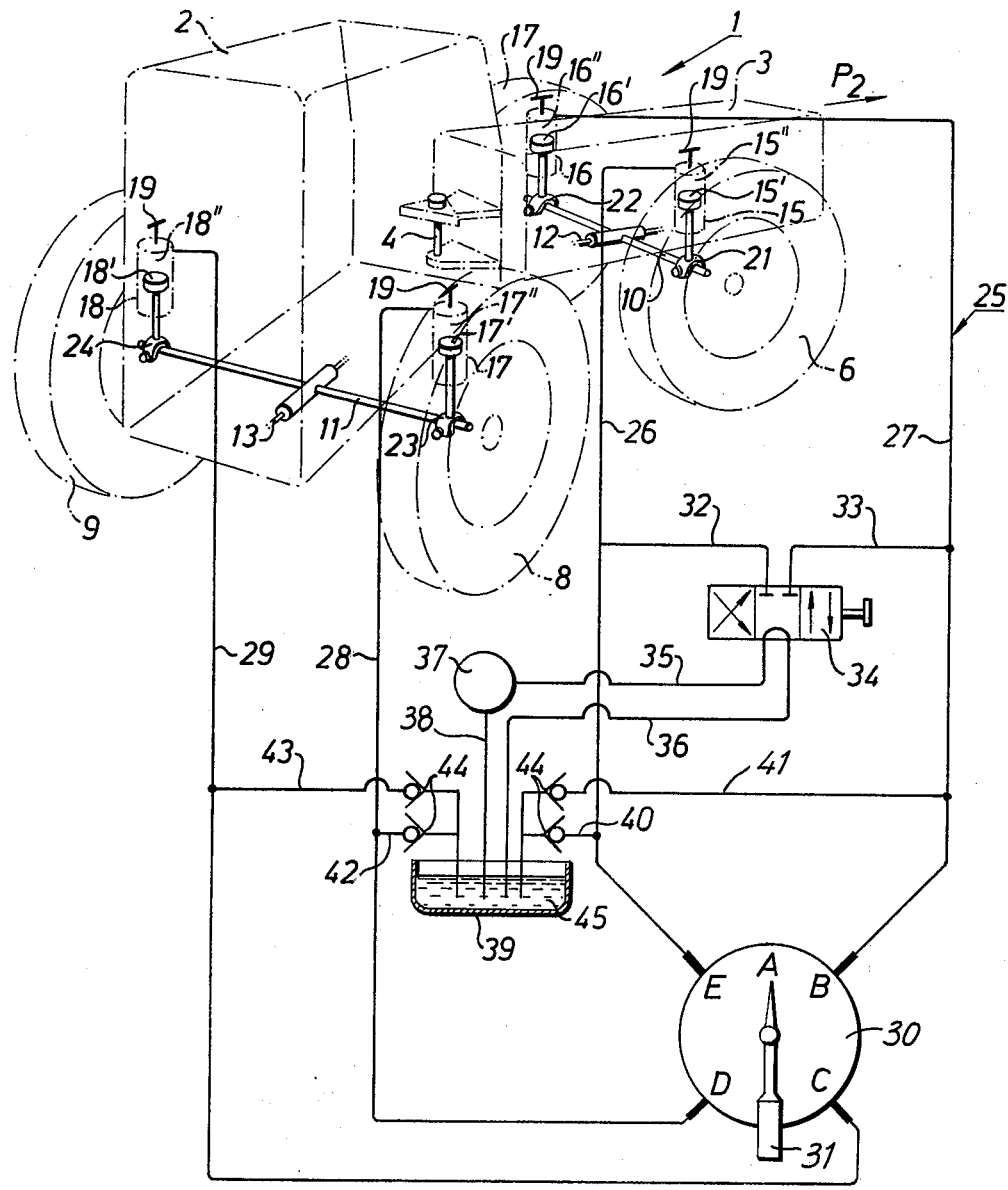
FIG. 6 shows, schematically and in perspective, the tractor according to the preceding figures, with a system for distributing pressure medium to the pressure cylinders arranged on the tractor, and FIGS. 7–11 schematically define five predetermined setting positions for a distribution valve arranged in the sketch according to FIG. 6.

With the tractor 1 shown in perspective, FIG. 6 shows diagrammatically a pressure medium system, generally denoted by the numeral 25, in connection with the pressure cylinders 15–18, the other denotations being the same as previously. The pressure cylinders 15–18 are shown as being single-acting, with pistons 15'–18' and pressure chambers 15''–18''. From each pressure chamber 15''–18'' extend pressure pipes 26,29, connected to a distribution valve 30 with a setting knob 31. The distribution valve 30 is built up as a hermetically closed valve means with a valve body (not shown) which, by means of the setting knob 31, can be put into different predetermined positions for separate connecting combinations between the pressure pipes 26–29, which will be more closely dealt with in the following:

A four-way type resetting valve 34, having feed pipe 35 and return pipe 36, is coupled by the branch pipes 32,33 in a shunt connection over the pressure pipes 26,27. The feed pipe 35 is coupled to a pressure medium pump 37 having a return pipe 38 opening out into a pressure medium container 39.

Branch pipes 40–43 are further connected to each of the pressure pipes 26–28, the branch pipes opening out into the pressure medium container 39 and having series connected return valves 44 which function as re-filling means for cavities arising due to possible leakage in the pressure medium system 25. Further non-specified devices of known type, e.g. oil filling or bleed nipples and the like can be provided in connection with the pressure cylinders 15–18 or the pressure medium system 25 for inspection and service etc. It is a provision for the continued description that all pressure chambers 15''–18'' in the pressure cylinders 15–18 as well as all the pipes and means in the pressure medium system 25 are completely filled with a suitable pressure medium, e.g. hydraulic oil 45, which also comes up to a suitable level in the pressure medium container 39.

Figure 7:
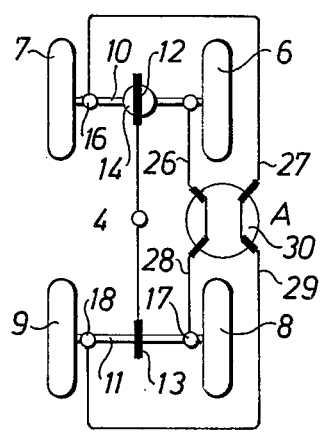
Figure 10:
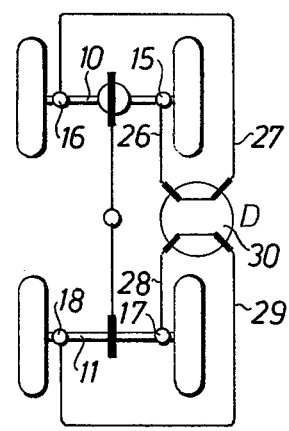
Figure 8:
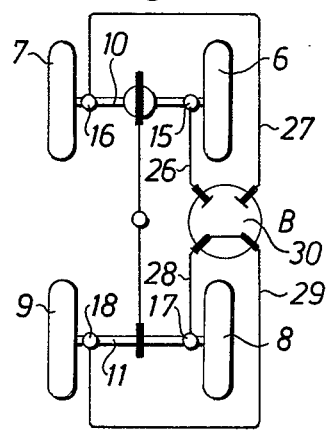

The distribution valve 30 is as previously mentioned adapted for manual adjustment in different positions, corresponding to predetermined connection combinations between the pressure pipes 26–28, which in their turn provide different ways for co-action between the pressure cylinders 15–18. In FIG. 6, five such positions have been noted on the distribution valve 30 with the letter designations A, B, C, D, E, these positions being clarified by schematic diagrams in FIGS. 7–11, the corresponding letter designation being given in the appropriate diagram. FIG. 7 thus shows a connection combination A in which the pressure cylinder 15 for the front axle 10 is connected to the pressure cylinder 17 for the rear axle 11, both cylinders being on the same side of the vehicle. The same condition prevails for the pressure cylinders 16,18 on the other side of the vehicle.

From FIG. 6, it will then be seen that raising the front wheel 6, for example, as shown in FIG. 4 caused a flow of oil from the pressure cylinder 15 to the pressure cylinder 17 via the pressure pipe 26, the distributing valve 30 and the pressure pipe 28. If it is assumed that all the pressure cylinders 15–18 are dimensioned alike, the piston rod 20 in the cylinder 17 will be pressed down as much as the piston rod in the cylinder 15 is pressed upward while passing over an obstruction 46 (FIG. 4). If the angle of slope for the front axle 10, on passing over the obstruction 46 is assumed to be $\alpha_1$, then the driver portion 2 and the engine portion 3 respectively, assume, on the condition that they lie approximately in line with each other, an angle of slope $\alpha_2$, in relation to a plumb line 47, which is only about half the size of the angle $\alpha_1$. The relationship is analogous when the rear wheel 8 passes over the obstacle 46 during the continued travel of the tractor (FIG. 4). In other words, the tractor chassis is only exposed to half the slope which the chassis would otherwise have taken up if there had been rigid connections between the axles 10,11 and the chassis.

FIG. 5 shows a position when the tractor is going over a section of terrain giving the opposite oblique positions for the axles 10,11 in relation to the chassis, the angles of slope being denoted by $\alpha_3$. In this situation the chassis takes up the same vertical position as in normal travel over flat ground (FIG. 3).

In the distribution valve 30 position A, the system reacts in certain respects as though the tractor were provided with a rotatable waist, although with the important advantage that the sideways swaying movements for portions 2,3 in movement over uneven terrain are reduced to half compared with a rotating waist tractor. In other words, the driver will be spared too great shifts in center of gravity and the risk of employment injuries will be considerably reduced.

When the distributing valve 30 is put in position B (FIG. 8) the pressure pipes 26,27 to the front axle 10 pressure cylinders 15,16 are each blocked, while the pressure pipes 28,29 to the rear axle 11 pressure cylinders 17,18 are connected to each other. The front axle 10 will then be rigidly connected to the engine portion 3 and the driver portion 2 respectively, while the rear axle 11 is pivotable in relation to the portions 2,3 and the function will be essentially the same as for a machine with a pivoting rear axle, e.g. an overhead dumper, i.e. a machine with a front-mounted implement such as lifting equipment.

In position B, the setting valve 34, also shown in FIG. 6 will come into use for supervising the slope of the portions 2,3 in relation to the prevailing position of the axles 10,11. In response to the position for the setting valve 34, pressure oil from the pump 37 can be distributed either through the pipe 26 or through the pipe 27 to the cylinders 15 and 16 respectively. Since the rear axle 11 is pivotable, a desired sloping position for the portions 2,3 can be provided in this way. This operation potential is especially advantageous when the engine portion 3 is equipped with high-lift equipment, e.g. a winch or the like, where there is risk of toppling.

In the distributing valve 30 position C (FIG. 9) the pressure pipes 26,27 to the front axle cylinders 15,16 are connected with each other while the pressure pipes 28,29 to the rear axle cylinders 17,18 are separately blocked. With this setting, the front axle will thus be pivoting instead, and the function will be approximately the same as with an agricultural tractor or log collecting machine with a pivoting front axle. The operational possibilities which are provided by this setting are especially advantageous when, for example, a log collecting winch or lifting equipment is mounted on the driver portion 2.

In the distributing valve 30 position D (FIG. 10) the pressure pipes 26,27 to the rear axle cylinders 15,16 are connected with each other and at the same time the pressure pipes 28,29 to the rear axle cylinders 17,18 are also in communication. This means that each of the axles 10,11 are pivoting, resulting in the portions 2,3 not being stabilized in relation to the axles 10,11, but can freely lean sideways. Position D is therefore only used in such cases where the portions 2,3 are torsionally rigidly connected with a vehicle or item of equipment with safe positional stability. For example, in such a case where the tractor 1 is used as a prime mover to a torsionally rigidly coupled trailer.

Figure 11:
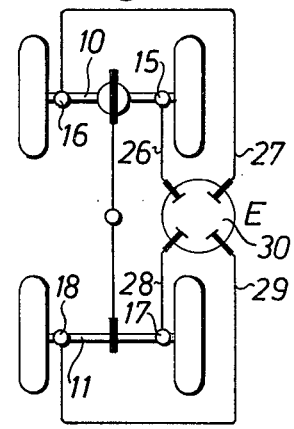
Figure 9:
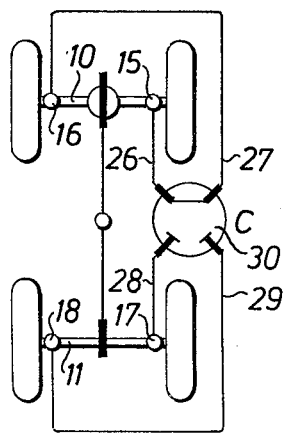

The distributing valve 30 position E is shown in FIG. 11 and indicates that all the pressure pipes 26–29 are each blocked. The axles 10,11 will then be rigidly connected with th portions 2,3. The setting is especially useful when driving over boggy ground, where there is the risk of a wheel sinking into the ground. Setting E is also used for stabilizing the tractor 1 when stationary, and when one of the portions 2 or 3 is equipped with a luffing crane for example.

It will be appreciated that position E is comparable with position D in relation to the possibilities for using the setting valve 34. The mutual angular position for the axles 10,11 can thus be suited to existing terrain conditions by utilizing the function which is accomplished by setting valve 34.

It may also be seen from the operational description that in the position A (FIG. 7) the slope of the portions 2,3 to the terrain can be affected by operating the setting valve 34. The pressure medium 45 can namely then be supplied to the system 25 either through the pipe 32 or through the pipe 33 (FIG. 6). In the first case the portions 2,3 will slope towards the lefthand side shown on the figures, in relation to the driving direction P2. In the second case a slope to the right is achived. This setting possibility for the chassis is a very large advantage when the vehicle is driven along a sloping section of terrain, when both the engine portion 2 and the driver portion 3 can be given a position in relation to the horizontal plane which is the most favourable possible from the point of view of the driver. The vehicle has an ability to shift upwardly in the terrain with the minimum amount of strain on the driver.

In general, the design and function of the described system in the different setting positions gives practically unlimited possibilities of adaption to different terrain conditions and working operations. By alternately utilizing different setting positions, the tractor 1 can be made to climb in even very rugged terrain which is not possible for conventional terrain vehicles. To this may be added the fact that equipment of the type normally used in agriculture and forestry is easy to mount either on the engine portion 3 or the driver portion 2, and that the equipment can be utilized in a rational manner through the operational characteristics obtained by the tractor in the system according to the invention.

A very important factor is, as has been mentioned earlier, that the sideways swaying movements of the portions 2,3 can be limited to a minimum by suitable operation of the distributing valve 30, this in turn reducing strains on the driver and lessening employment accident risks.

The system has been described in relation with single-acting pressure cylinders 15–18. It is, however, to be understood that double-acting pressure cylinders can also be utilized, the lower chambers of such types of cylinder being connected to a setting valve with doubled-up functions, arranged so that the pipes are connected with each other in a manner required for achieving the described working methods in different setting positions.

It has been earlier mentioned that the pressure cylinders can be arranged in multiphariously different ways. It is thereto also possible to carry out the positional adjustment for the axles, especially for vehicles without waist articulation, in a purely mechanical way, e.g. with cables or by a combination of cables and tension rods. It is also possible to combine cables with pressure cylinders to achieve the necessary positional re-setting of the axles.

It is also within the scope of the patent to arrange the setting valve 34 in connection with the pressure pipes 28,29 to the rear axle 11 pressure cylinders 17,18. It is also possible to supplement the system shown in FIG. 6 by an extra setting valve in connection with the pressure pipes 28,29 and fed from the pump 37.

What I claim is:

1. A pivoting axle system for a terrain vehicle which comprises in combination, a first and a second rigid wheel axle disposed for supporting a chassis portion of the vehicle, said first and second axles each being centrally suspended and vertically pivotable about a pivotal point, a first and a second co-acting movable member each disposed on opposite sides of the pivotal point and coupled between the axle and a chassis portion of the vehicle, means for interconnecting all of said co-acting movable members to a control means for controlling operation of each co-acting movable member on the first rigid wheel axle relative to a correspondingly disposed co-acting movable member on the second rigid wheel axle, said first axle being caused to oppositely pivot relative to said second axle by interconnection of the co-acting members.

2. The pivoting axle system of claim 1 wherein said co-acting movable members are pressure cylinders and wherein said interconnecting means are pipes for providing coupling between the pressure cylinders.

3. The pivoting axle system of claim 2 wherein the pressure cylinders are single-acting and the control means is a distributing valve arranged for coupling combinations of the pipes such that the pressure pipes to side-situated pairs of pressure cylinders and the pressure pipes to the pairs of pressure cylinders situated on the respective axles can be commonly connected or individually blocked.

4. The pivoting axle system of claim 3 wherein a setting valve is shunt connected to at least one pair of the pressure pipes for a pair of cylinders on one axle, the setting valve obtaining pressure medium from a source of pressure and with reversability distributes the pressure medium to the pressure pipes.

5. The pivoting axle system of claim 1 wherein said co-acting members are arranged to be brought into such co-action that the common plane for the chassis portion can be angularly set relative to the axles in the respective pivoting plane.

6. The pivoting axle system of claim 1 wherein the chassis portion supported by the first rigid wheel axle and the chassis portion supported by the second rigid wheel axle are coupled to each other by a vertical pin disposed for allowing angular movement in a horizontal plane and rigidly joined movement in a vertical plane.

* * * * *